United States Patent
Khan et al.

(10) Patent No.: US 12,003,408 B2
(45) Date of Patent: Jun. 4, 2024

(54) POLICY VALIDATION

(71) Applicant: Cisco Technology, Inc., San Jose, CA (US)

(72) Inventors: Atahar Khan, Bangalore (IN); Ankush Ganpatrai Arora, Mumbai (IN); Amit Dhamija, Bangalore (IN); Naveen Eranoor, Bangalore (IN); Chandrashekar Vasudevan, Bangalore (IN); Rajiv Asati, Morrisville, NC (US)

(73) Assignee: Cisco Technology, Inc., San Jose, CA (US)

( * ) Notice: Subject to any disclaimer, the term of this patent is extended or adjusted under 35 U.S.C. 154(b) by 246 days.

(21) Appl. No.: 17/522,515

(22) Filed: Nov. 9, 2021

(65) Prior Publication Data

US 2023/0145237 A1   May 11, 2023

(51) Int. Cl.
*H04L 45/24* (2022.01)
*G06N 20/00* (2019.01)
*H04L 45/02* (2022.01)
*H04L 45/42* (2022.01)

(52) U.S. Cl.
CPC .............. *H04L 45/24* (2013.01); *G06N 20/00* (2019.01); *H04L 45/02* (2013.01); *H04L 45/42* (2013.01)

(58) Field of Classification Search
CPC ......... H04L 45/24; H04L 45/02; H04L 45/42; H04L 45/22; H04L 45/28; G06N 20/00; G06N 20/20
See application file for complete search history.

(56) References Cited

U.S. PATENT DOCUMENTS

| | | | |
|---|---|---|---|
| 2010/0202773 A1* | 8/2010 | Lee | H04J 14/0256 398/48 |
| 2013/0031244 A1 | 1/2013 | Zhang et al. | |
| 2013/0336126 A1 | 12/2013 | Vasseur et al. | |
| 2015/0063804 A1 | 3/2015 | Lee et al. | |
| 2015/0249591 A1 | 9/2015 | Alvarez et al. | |
| 2016/0134509 A1 | 5/2016 | Dong et al. | |
| 2021/0135982 A1* | 5/2021 | Chaturmohta | H04L 45/28 |
| 2023/0067946 A1* | 3/2023 | Alaettinoglu | H04L 45/28 |

* cited by examiner

*Primary Examiner* — Abdulkader M Alriyashi
(74) *Attorney, Agent, or Firm* — Lee & Hayes P.C.

(57) ABSTRACT

This disclosure describes techniques for policy validation techniques relating to data traffic routing among network devices. The techniques may include processing a validation request from a controller. A validation request may include information related to a computed path for routing data traffic in a computing network. The processing may include sending one or more path requests to one or more redundant controllers, and comparing computed paths from the redundant controller(s) to the originally computed path. The techniques may include generating a validation response based on comparing the computed paths. In some examples, the techniques may further include determining a health score for the controller. Policy validation techniques may improve data traffic routing among network devices by helping to ensure valid policies are produced.

20 Claims, 9 Drawing Sheets

400 ⇢

| SID | Source IP | Dest IP | CPU Utilzn | Memory Utilz | Time stamp | SR-PCE ID | Path Validation Result |
|---|---|---|---|---|---|---|---|
| 4000 | 10.1.51.33 | 10.1.49.213 | 20 | 90 | 5/29/2013 0:00 | A | 0 |
| 3500 | 10.1.49.213 | 10.1.51.33 | 35 | 75 | 8/29/2013 0:00 | D | 0 |
| 5750 | 10.1.49.213 | 10.1.50.138 | 54 | 84 | 12/2/2013 0:00 | A | 0 |
| 5000 | 10.1.50.138 | 10.1.51.33 | 6 | 60 | 2/9/2014 0:00 | E | 0 |
| 3500 | 10.1.51.33 | 10.1.49.213 | 52 | 66 | 4/13/2015 0:00 | E | 1 |
| 3125 | 10.1.49.213 | 10.1.49.213 | 40 | 46 | 7/12/2013 0:00 | D | 0 |
| 5125 | 10.1.49.213 | 10.1.51.33 | 65 | 80 | 6/28/2014 0:00 | C | 1 |
| 4750 | 10.1.50.138 | 10.1.51.33 | 35 | 91 | 10/7/2013 0:00 | E | 0 |
| 5000 | 10.1.49.213 | 10.1.50.138 | 35 | 50 | 2/1/2014 0:00 | B | 0 |
| 6125 | 10.1.51.33 | 10.1.51.33 | 60 | 48 | 12/12/2013 0:00 | D | 1 |
| 3625 | 10.1.49.213 | 10.1.50.138 | 14 | 54 | 9/22/2013 0:00 | C | 1 |
| 3500 | 10.1.50.138 | 10.1.49.213 | 51 | 79 | 8/10/2013 0:00 | C | 1 |
| 5625 | 10.1.50.138 | 10.1.51.33 | 53 | 90 | 4/21/2014 0:00 | D | 0 |
| 4750 | 10.1.49.213 | 10.1.50.138 | 33 | 76 | 12/9/2014 0:00 | D | 0 |
| 2625 | 10.1.51.33 | 10.1.51.33 | 35 | 47 | 7/2/2014 0:00 | E | 1 |
| 5500 | 10.1.50.138 | 10.1.49.213 | 66 | 94 | 2/16/2014 0:00 | C | 0 |
| 3125 | 10.1.51.33 | 10.1.49.213 | 7 | 80 | 12/29/2014 0:00 | E | 0 |
| 4375 | 10.1.49.213 | 10.1.50.138 | 25 | 80 | 2/15/2014 0:00 | C | 1 |
| 3250 | 10.1.49.213 | 10.1.50.138 | 29 | 43 | 5/19/2014 0:00 | B | 1 |
| 3000 | 10.1.51.33 | 10.1.49.213 | 61 | 66 | 6/3/2014 0:00 | B | 1 |
| 6250 | 10.1.51.33 | 10.1.51.33 | 70 | 43 | 5/12/2014 0:00 | B | 0 |
| 5750 | 10.1.50.138 | 10.1.50.138 | 68 | 55 | 5/8/2013 0:00 | E | 0 |
| 2625 | 10.1.51.33 | 10.1.51.33 | 45 | 87 | 2/5/2015 0:00 | D | 0 |
| 5000 | 10.1.50.138 | 10.1.49.213 | 1 | 74 | 9/27/2014 0:00 | D | 1 |
| 3750 | 10.1.50.138 | 10.1.49.213 | 3 | 55 | 10/15/2013 0:00 | D | 1 |
| 4500 | 10.1.49.213 | 10.1.51.33 | 7 | 83 | 12/28/2013 0:00 | D | 1 |
| 4625 | 10.1.51.33 | 10.1.51.33 | 11 | 52 | 7/22/2014 0:00 | D | 0 |
| 5750 | 10.1.50.138 | 10.1.50.138 | 24 | 69 | 2/1/2015 0:00 | C | 1 |
| 3500 | 10.1.51.33 | 10.1.49.213 | 33 | 55 | 1/16/2015 0:00 | E | 1 |
| 2625 | 10.1.49.213 | 10.1.51.33 | 51 | 64 | 5/2/2013 0:00 | B | 1 |
| 3000 | 10.1.49.213 | 10.1.50.138 | 63 | 93 | 4/12/2015 0:00 | B | 0 |
| 3125 | 10.1.50.138 | 10.1.51.33 | 50 | 79 | 10/26/2014 0:00 | E | 0 |
| 3875 | 10.1.51.33 | 10.1.49.213 | 12 | 80 | 2/11/2014 0:00 | B | 0 |
| 4375 | 10.1.49.213 | 10.1.49.213 | 30 | 90 | 12/30/2013 0:00 | D | 1 |
| 2750 | 10.1.49.213 | 10.1.51.33 | 2 | 58 | 5/19/2013 0:00 | A | 0 |
| 4875 | 10.1.50.138 | 10.1.51.33 | 14 | 40 | 11/5/2014 0:00 | C | 1 |
| 3750 | 10.1.49.213 | 10.1.50.138 | 52 | 48 | 10/20/2014 0:00 | A | 0 |
| 4000 | 10.1.51.33 | 10.1.49.213 | 1 | 62 | 12/7/2013 0:00 | B | 1 |
| 3625 | 10.1.49.213 | 10.1.51.33 | 2 | 72 | 5/8/2015 0:00 | B | 0 |
| 5000 | 10.1.50.138 | 10.1.50.138 | 66 | 43 | 7/24/2014 0:00 | D | 0 |
| 5875 | 10.1.50.138 | 10.1.51.33 | 22 | 75 | 6/7/2013 0:00 | C | 0 |
| 6000 | 10.1.49.213 | 10.1.49.213 | 23 | 84 | 4/11/2015 0:00 | A | 0 |
| 2750 | 10.1.51.33 | 10.1.49.213 | 40 | 56 | 10/31/2014 0:00 | D | 1 |
| 3375 | 10.1.50.138 | 10.1.51.33 | 69 | 62 | 12/29/2013 0:00 | A | 0 |
| 4625 | 10.1.51.33 | 10.1.51.33 | 60 | 49 | 6/18/2014 0:00 | C | 1 |
| 4625 | 10.1.49.213 | 10.1.50.138 | 46 | 59 | 3/28/2014 0:00 | D | 0 |
| 4750 | 10.1.49.213 | 10.1.49.213 | 44 | 52 | 1/15/2015 0:00 | C | 1 |
| 4375 | 10.1.51.33 | 10.1.51.33 | 21 | 40 | 9/26/2013 0:00 | C | 1 |
| 5625 | 10.1.51.33 | 10.1.50.138 | 3 | 90 | 8/18/2013 0:00 | A | 1 |

402 (Path Validation Result column)

FIG. 4

```
import pandas as pd
import numpy as np
from sklearn.preprocessing import LabelEncoder
from sklearn.preprocessing import MinMaxScaler
import seaborn as sns
import matplotlib.pyplot as plt
%matplotlib inline
pathData = pd.read_csv("Sample Data.csv")
print(pathData.head())
print("\n")
print(pathData.describe())
print("\n")
print(pathData.isna().sum())
print("\n")
labelEncoder = LabelEncoder()
labelEncoder.fit(pathData['SID'])
pathData['SID'] = labelEncoder.transform(pathData['SID'])
labelEncoder = LabelEncoder()
labelEncoder.fit(pathData['Source IP'])
pathData['Source IP'] = labelEncoder.transform(pathData['Source IP'])
labelEncoder = LabelEncoder()
labelEncoder.fit(pathData['Dest IP'])
pathData['Dest IP'] = labelEncoder.transform(pathData['Dest IP'])
labelEncoder = LabelEncoder()
labelEncoder.fit(pathData['Time stamp'])
pathData['Time stamp'] = labelEncoder.transform(pathData['Time stamp'])

labelEncoder = LabelEncoder()
labelEncoder.fit(pathData['SR-PCE ID'])
pathData['SR-PCE ID'] = labelEncoder.transform(pathData['SR-PCE ID'])
pathData
X = np.array(pathData.drop(['Path Validation Result from Claim 1',
        'SID','Source IP','Dest IP','SR-PCE ID'], 1).astype(float))
```

```
X_rf = np.array(pathData.drop(['Path Validation Result from Claim
1','SID'],    1))
y = np.array(pathData['Path Validation Result from Claim 1'])
y_rf = np.array(pathData['Path Validation Result from Claim 1'])
y
from sklearn.ensemble import RandomForestClassifier
from sklearn.datasets import make_classification
```

```
clf = RandomForestClassifier(random_state=0)
clf.fit(X_rf, y_rf)
RandomForestClassifier(...)
X_rf[10]
y_rf[10]
predicted = (clf.predict(X_rf))
sum(predicted == y_rf)
clf.feature_importances_
X_rf[10]
sum(X_rf[0]*clf.feature_importances_)
y[0]
sums = np.sum(X_rf* clf.feature_importances_,axis=1)
health_scores = (sums - min(sums))/(max(sums) - min(sums))
print(predicted)
print(y)
```

FIG. 5

POLICY VALIDATION

TECHNICAL FIELD

The present disclosure relates generally to validating policies regarding network behavior, thereby improving performance of the network.

BACKGROUND

In network environments, data traffic may be routed by a multitude of paths among networked devices between a source and a destination. Traditionally, path selection may have been performed by routers or other elements within a network. Any given router may have been tasked with calculating a path through the network. With software-defined networking (SDN), a controller, such as a segment routing-path computation element (SR-PCE), may perform path selection services for the network. The SR-PCE may select a path for any given data packet to utilize overall network bandwidth more effectively. Therefore network performance may be improved where an SR-PCE is providing efficient path selection.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. In some cases, parentheticals are utilized after a reference number to distinguish like elements. Use of the reference number without the associated parenthetical is generic to the element. The systems depicted in the accompanying figures are not to scale and components within the figures may be depicted not to scale with each other.

FIG. 4 illustrates example data related to policy validation processes, in accordance with the present concepts. The example data may be used as input(s) to a policy validation process and/or stored in a validation database, for instance.

FIG. 5 illustrates another example process related to policy validation concepts, in accordance with the present concepts. The example process may represent code used with a validation engine, for instance.

DESCRIPTION OF EXAMPLE EMBODIMENTS

Overview

Figure 1:
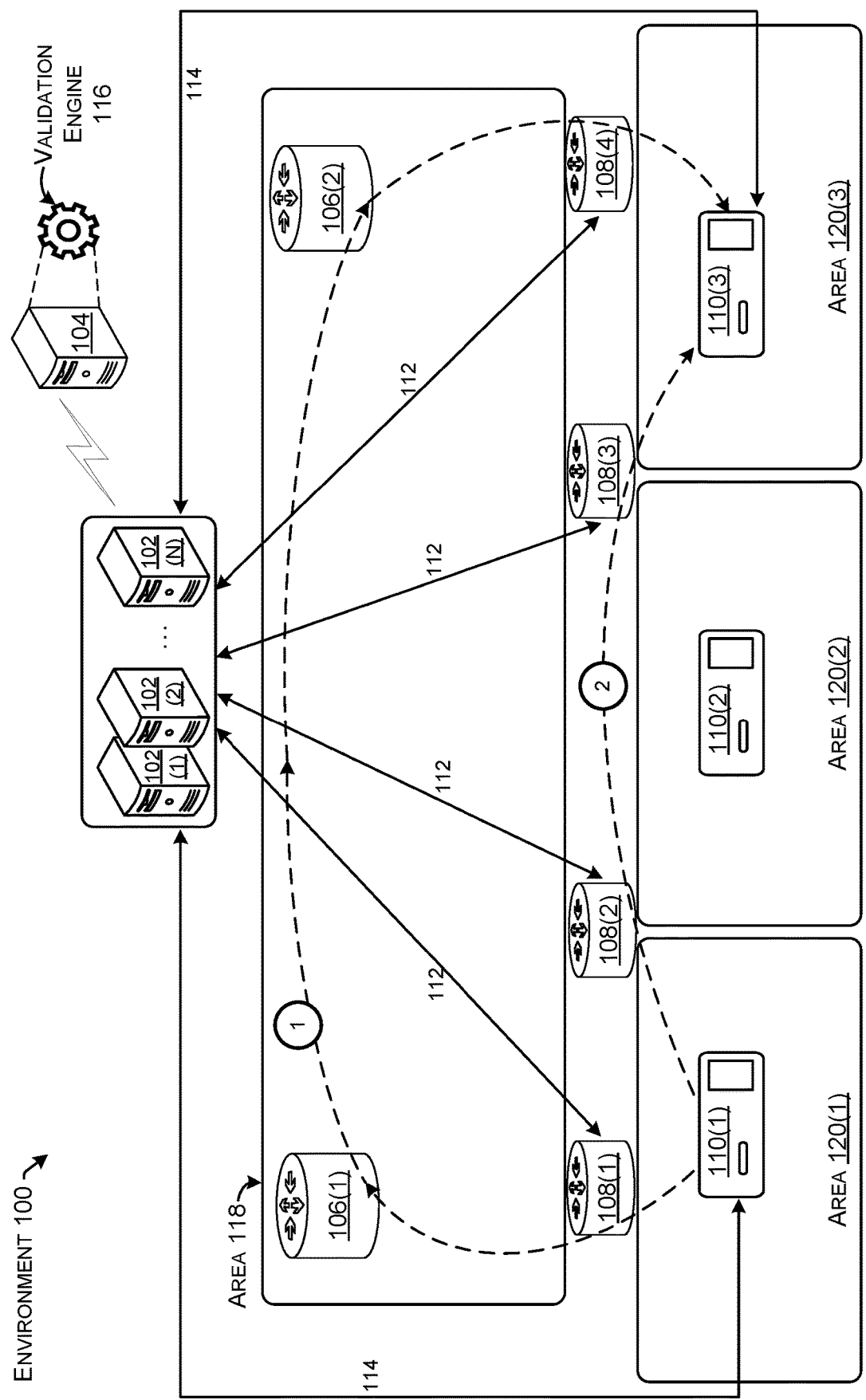
FIG. 1 illustrates a component diagram with an example environment in which policy validation may be performed as part of communications between network devices, in accordance with the present concepts.

This disclosure describes, at least in part, a method that may be implemented by a server device communicatively coupled to one or more controllers, such as a primary controller and at least one redundant controller. The server device may include a validation engine. The method may include receiving, at the validation engine and from the primary controller, a validation request. The validation request may include a first computed path for routing data traffic in a computing network. In response to receiving the validation request, the method may include sending, from the validation engine and to the redundant controller, a path request relating to the validation request. The method may include receiving, at the validation engine and from the redundant controller, a second computed path relating to the path request. The method may also include comparing the first computed path to the second computed path. Based at least in part on the comparing, the method may include generating a validation response. In some examples, the method may further include sending the validation response from the validation engine to the primary controller.

This disclosure also describes, at least in part, a method that may be implemented by a server device communicatively coupled to at least one controller. The method may include receiving path validation information relating to the controller. Based at least in part on the path validation information, the method may include determining a health variable for the controller. The method may include accessing a validation database for data corresponding to a network that includes the controller. Utilizing the health variable and/or the data from the validation database, the method may include determining a health score for the controller. Finally, the method may include sending the health score for the controller to an administrator of the network.

Additionally, the techniques described herein may be performed by a system and/or device having non-transitory computer-readable media storing computer-executable instructions that, when executed by one or more processors, performs any of the methods described above.

EXAMPLE EMBODIMENTS

This disclosure describes techniques for policy validation in a network. Policy validation concepts may include ensuring that a policy, a path, path metrics, and/or other requests from a node (e.g., client, path computation client (PCC)) are fulfilled. For instance, a controller may calculate and/or provide paths and/or policies to nodes across the network. The controller may include a policy validation engine that may be able to assure the validity of any path and/or policy provided by the controller. Policy validation concepts may also include ensuring that service constraints are met. In some implementations, path validation concepts may also include confirming that a controller is in good health in order to serve requests received from nodes.

In controller-based architecture, the controller may be viewed as a central entity that will calculate and provide a constraint-based path and/or policy to the nodes across the network. An SDN-based approach may be used to control, change, and/or manage network behavior dynamically by the central controller. In multi-domain architecture, border gateway protocol link-state (BGP-LS) may be used by a controller, such as a segment routing path computation element (SR-PCE), to fetch topology information from interior gateway protocol (IGP) domains, for instance. Further, path computation element communication protocol (PCEP) may be used to provide the SR policy to headend routers. However, in some instances, controllers may respond with an incorrect SR policy. The controller may respond with an incorrect SR policy for various reasons, such as having an incorrect session identifier (SID) list, which could be caused by a BGP-LS malfunction, session flap for some nodes (e.g., database inconsistency), controller resource issues, and/or software defects, for instance. Providing an incorrect SR policy may lead to serious consequences in the programmed network. For example, consequences of an incorrect SR policy may include suboptimal routing, traffic blackholing, traffic diversion to an undesired domain, security vulnerabilities, and/or compromised service level agreements (SLAs). The present policy validation techniques are intended to address and/or potentially prevent the problem of an incorrect SR Policy provided by an SR-PCE. For example, in the case of the BGP-LS malfunction suggested above, a policy validation check with a redundant SR-PCE which had been populated using a separate BGP-LS session may help identify an issue. Therefore, using policy validation techniques, customer impact may be avoided.

In some implementations, a validation engine may be configured to ensure that path metrics and/or constraints requested by PCCs to the SR-PCE are fulfilled, and/or to confirm that the SR-PCE is in good health to serve the requests sent by the PCCs. The actions performed by the validation engine may include path validation (e.g., realtime path validation). In some examples, path validation may be performed using comparison. For instance, when the validation engine receives a request from an SR-PCE (a primary SR-PCE in this instance), the validation engine may query one or more redundant SR-PCEs for the paths that the redundant SR-PCEs computed for the same request. The validation engine may then perform a comparison to confirm whether the path provided by the primary SR-PCE is valid. Stated another way, path validation may be viewed as a network control system in which there are multiple sources of truth for a policy that can be used to assure the validity of the policy by peer revision at the network control plane.

Regarding health of the SR-PCE, the validation engine may be configured to perform a health validation. The heath validation may produce a health score of the SR-PCE. The health score may then be provided to the SR-PCE, and/or may be made available to an administrator. The health score may be used to investigate an underlying problem with performance of the SR-PCE, for example. This health score may also be used by the administrator and/or an orchestrator (e.g., network services orchestrator (NSO)) to change a priority for the SR-PCE. In some implementations, the health score data may be leveraged to predict a possibility of downtimes. For instance, if there is a relatively high possibility of downtime by taking a primary SR-PCE, or an SR-PCE with high reliability, down for maintenance, the administrator can find a workaround, such as a temporary network design change. The workaround may potentially be used to plan maintenance of an SR-PCE with minimum network downtime. The health score data may also help predict the effectiveness and/or resiliency of bringing multiple SR-PCEs online for the network. In some examples, the health validation may be a machine learning (ML) based validation.

To summarize, for a network architecture in which a controller (e.g., SR-PCE) provides paths to one or more routers, policy validation concepts may be beneficial to ensure that service constraints are met. In some examples, a validation engine may be used to validate any particular policy and/or path. The validation engine may also perform a health check on the controller and/or may generate a health score. As such, policy validation concepts may be used to catch, correct, and/or predict incorrect policies, thereby improving the performance of the network.

Although the examples described herein may refer to a controller as the point of generation of policy validation communications, the techniques can generally be applied to any device in a network. Further, the techniques are generally applicable for any network of devices managed by any entity where virtual resources are provisioned. In some instances, the techniques may be performed by software-defined networking (SDN), and in other examples, various devices may be used in a system to perform the techniques described herein. The devices by which the techniques are performed herein are a matter of implementation, and the techniques described are not limited to any specific architecture or implementation.

The techniques described herein provide various improvements and efficiencies with respect to network communications. For instance, the techniques described herein may reduce the amount of computational resource use, storage, dropped data, latency, and other issues experienced in networks due to lack of network resources, overuse of network resources, issues with timing of network communications, and/or improper routing of data. By improving network communications across a network, overall performance by servers and virtual resources may be improved.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates an example environment 100 in accordance with the present policy validation concepts. Environment 100 may include various computing devices, such as one or more servers 102, server 104, routers 106, routers 108, and/or access points 110. As noted above, the use of the same reference numbers in different figures indicates similar or identical items. In some cases, parentheticals are utilized after a reference number to distinguish like elements. Use of the reference number without the associated parenthetical is generic to the element. Accordingly, three servers 102 are shown in FIG. 1, including server 102(1), server 102(2), and server 102(N), where the "N" indicates any number of additional servers 102. Although reference may be made to a particular type of computing device (i.e., server), the computing devices may comprise any type of networked device, such as controllers, routers, servers, switches, hubs, bridges, gateways, modems, repeaters, access points, hosts, etc. in accordance with policy validation concepts.

In some implementations, environment 100 may represent a networked environment, with logical connections connecting any of the illustrated computing devices and/or other computing devices or systems. Within the example environment 100, the computing devices may exchange communications (e.g., packets) via a network connection(s), such as example network connections 112 and/or 114, shown as double arrows, or a lightning bolt (not specifically designated). Not all potential network connections between computing devices are shown in FIG. 1 to avoid clutter on the drawing page. The network connections may be transport control protocol (TCP) network connections or any network connection (e.g., information-centric networking (ICN)) that enables a computing device to exchange packets with another device(s), such as via a cloud computing network. For example, the network connections may represent data paths between computing devices. It should be appreciated that the term "network connection" may also be referred to as a "network path." The reference to a cloud computing network in this example is not meant to be limiting. Other types of networks are contemplated in accordance with policy validation concepts.

In example environment 100, any of servers 102 may represent a controller, such as a segment routing path computation element (SR-PCE). Servers 102 may communicate with various computing devices of environment 100 to perform controller duties, such as assisting with routing data traffic among the computing devices in environment 100. Also illustrated in FIG. 1, server 104 may include a validation engine 116. Validation engine 116 may be separate in terms of function from the servers 102, but may be physically located near servers 102, such as in a same data center with at least one of servers 102. Alternatively, validation engine 116 may be a cloud-based service.

In some examples, routers 106 may be associated with an area 118 of environment 100. Similarly, access points 110 may be associated with areas 120 of environment 100. For example, area 118 may represent a core indoor geolocation platform (IGP), while areas 120 may represent other IGPs, and/or local area networks (LANs). Access points 110 may represent access points for the respective areas 120, for instance. Servers 102 may help route data traffic between areas 118 and/or 120. In some examples, routers 106 may comprise core routers, and routers 108 may comprise area border routers (ABRs). For instance, routers 108 may be located at borders between areas 118 and 120. Routers may help with routing traffic between these areas. In some examples, servers 102 may communicate with the access points 110 over network connections 114 using path computation element communication protocol (PCEP), or another suitable protocol. Further, servers 102 may communicate with the routers 108 over network connections 112 using border gateway protocol link-state (BGP LS), for instance.

FIG. 1 illustrates a scenario that includes two example paths (e.g., data paths, routes, SID lists) between access point 110(1) and access point 110(3). The paths are indicated with dashed, numbered lines. For example, "Path 1" may represent data traffic from access point 110(1), through routers 108(1), 106(1), 106(2), and 108(4), and to access point 110(3). "Path 2" may represent data traffic from access point 110(1), through routers 108(2) and 108(3), and to access point 110(3). In general, some potential paths for data traffic across a network may be relatively more desirable than other potential paths across the network, for a variety of reasons. For instance, some paths may be more desirable where they correspond to shorter travel times, shorter distance traveled, less resources used, lower cost, etc. For purposes of explanation, a relatively more desirable path may be referred to herein as a "correct" or "valid" path, while a relatively less desirable path may be referred to as an "incorrect" or "invalid" path.

In the scenario depicted in FIG. 1, Path 2 may be viewed as a more desirable path than Path 1. For instance, Path 2 may represent a shorter and/or faster path from access point 110(1) to access point 110(3). However, a controller located at a server 102 may initially provide Path 1 for the data traffic. In this instance, validation engine 116 may participate in a variety of policy validation processes regarding the data traffic routing from access point 110(1) to access point 110(3). For example, validation engine 116 may take part in determining that Path 1 is an incorrect (e.g., less desirable) path, may prompt a controller to find a more desirable path, may help determine that Path 2 is a correct path, may provide a health score regarding a controller that arrived at an incorrect path, etc. Examples types of communications that may occur with respect to policy validation concepts will now be described in more detail relative to FIG. 2.

Figure 2:
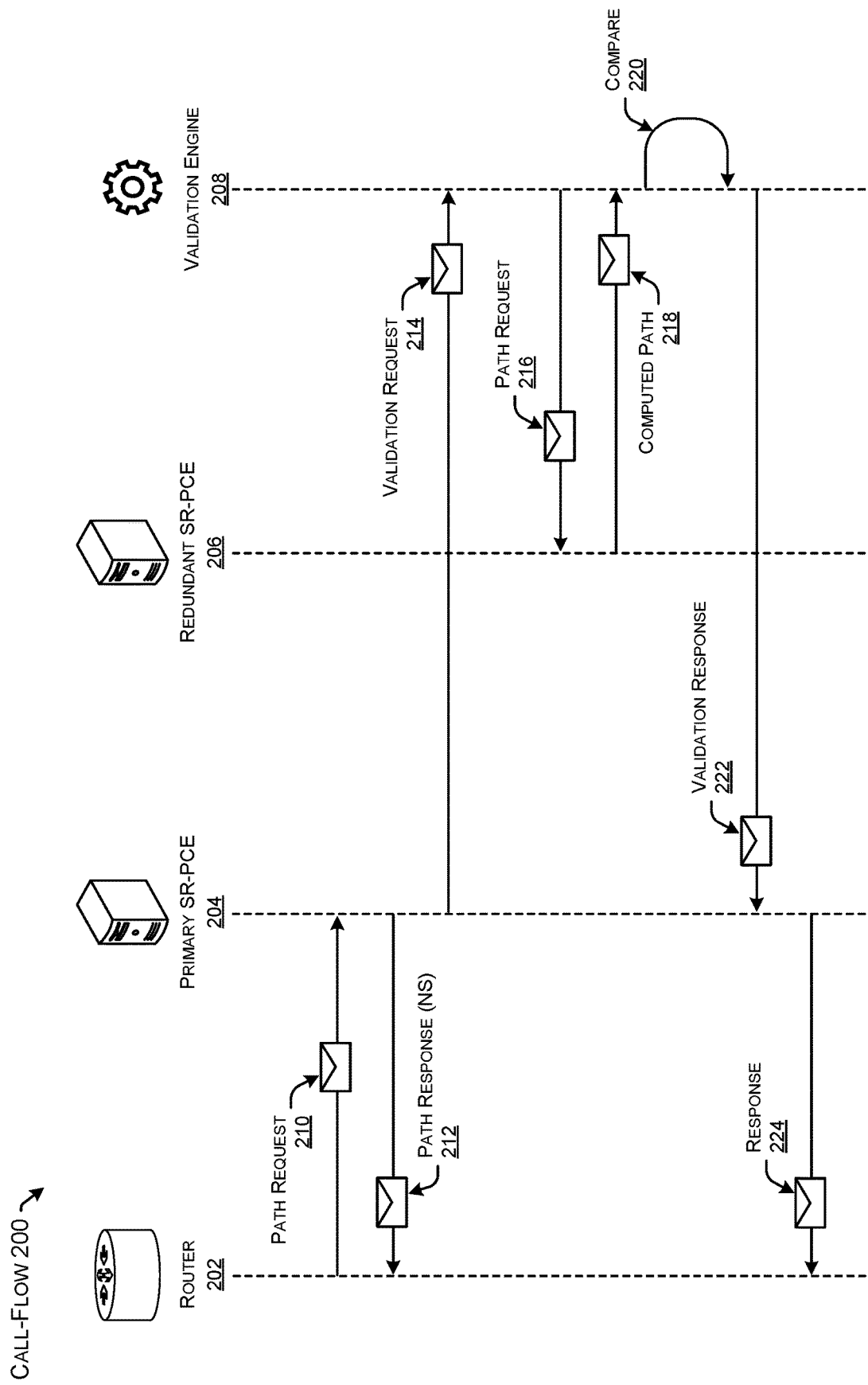
FIG. 2 illustrates an example call-flow related to policy validation communications among computing devices, in accordance with the present concepts.

FIG. 2 depicts an example call-flow 200, including example communications between a router 202, a primary SR-PCE 204, a redundant SR-PCE 206, and/or a validation engine 208. Router 202 may be similar to router 108(1) of FIG. 1, which may be communicatively connected with access point 110(1), for instance. Primary SR-PCE 202 and/or redundant SR-PCE 204 may be examples of controllers located at the one or more servers 102 of FIG. 1, for example. Finally, validation engine 208 may be similar to validation engine 116 of FIG. 1. Some aspects of the example shown in FIG. 2 may be similar to aspects of the example described above relative to FIG. 1. Therefore, for sake of brevity, not all elements of FIG. 2 will be described in detail.

Example call-flow 200 may represent a policy validation process regarding data traffic across a network, similar to the potential data traffic from access point 110(1) to access point 110(3) described relative to FIG. 1.

In example call-flow 200 of FIG. 2, router 202 may send a path request 210 to primary SR-PCE 204. For example, router 202 may have received a request to route data traffic across a network. In this example, path request 210 may simply be a forwarded request that was received from another device, such as the data traffic sending device, or an access point that the sending device is connected to, etc. Path request 210 may correspond to an intent to send data traffic from access point 110(1) to access point 110(3), for instance.

In response to receiving path request 210, primary SR-PCE 204 may respond depending on whether it is subscribed (e.g., registered) to validation engine 208. Stated another way, in an instance where primary SR-PCE 204 is not subscribed to a validation engine, primary SR-PCE 204 may simply fulfill path request 210 by providing path response 212 to router 202, rather than taking action regarding policy validation.

Alternatively, in an instance where primary SR-PCE 204 is subscribed to validation engine 208, primary SR-PCE 204 may send a validation request 214 to validation engine 208. In general, subscription of a SR-PCE or other controller to a validation engine may include sending information from the controller to the validation engine to enable to the validation engine to make informed decisions about the network. For example, a controller may send real-time and/or periodic updates to the validation engine. An update may include an SID list, for instance. The SID list may correspond to an SID list that the controller provided for a source-destination pair, for example. An update may also include other associated metrics regarding routing of data traffic over a network.

Validation request 214 may contain information related to path request 210. Validation request 214 may also contain information related to an SID list corresponding to the source-destination pair referenced in the path request 210. For instance, validation request 214 may include an SID list corresponding to access point 110(1) and access point 110(3). In some examples, the validation request 214 may be sent using PCEP or some other appropriate protocol. For instance, in an example where validation engine 208 may be a cloud-based service, a representational state transfer (REST) application programming interface (API) may be used.

In response to receiving validation request 214, validation engine 208 may send path request 216 to redundant SR-PCE 206. Path request 216 may be sent using PCEP, or another protocol. Validation engine 208 may reach out to redundant SR-PCE 206 in order to perform policy validation, such as determining whether an SID list provided by primary SR-PCE 204 is correct. Therefore, path request 216 may be viewed as a path validation check. Path request 216 may be similar to path request 210, prompting redundant SR-PCE 206 to compute a path from access point 110(1) to access point 110(3), for instance. Redundant SR-PCE may then return computed path 218 to validation engine 208. Note that validation engine 208 may also reach out to additional, redundant SR-PCEs in order to perform policy validation. For instance, validation engine 208 may also reach out to (potentially) all other subscribed SR-PCEs to attempt policy validation and/or a validation check regarding validation request 214.

Computed path 208 may represent a SID list generated by redundant SR-PCE 206 in response to path request 216. Computed path 208 may be part of a PCEP (or other protocol) message returned to validation engine 208. In some examples, validation engine 208 may build a data model for a source-destination pair with potentially all of the SID lists for that particular source-destination pair.

At 220, validation engine 208 may compare information received from primary SR-PCE 204 and redundant SR-PCE 206. For example, validation engine 208 may compare a first SID list received from primary SR-PCE 204 to a second SID list received from redundant SR-PCE 206. Validation engine 208 may also compare the first SID list received from primary SR-PCE 204 to other SID lists received from other SR-PCEs. Further, validation engine 208 may compare the first SID list to a model built from multiple SID lists for the source-destination pair. After the comparing process at 220, the validation engine 208 may send a validation response 222 to primary SR-PCE, concluding the policy validation process.

The validation response 222 may include information indicating whether the validation process found the SID list and/or potential data traffic path to be valid. For example, in an instance where validation engine 208 finds the first SID list to be valid, validation response 222 may represent a validation "success" message. In this instance, primary SR-PCE 204 may proceed by sending a response 224 to router 202 that may include path information, the first SID list, and/or other information that may facilitate data traffic proceeding from access point 110(1) to access point 110(3), for example.

In an instance where validation engine 208 finds the SID list and/or potential data traffic path to be invalid, validation engine 208 may respond in a variety of ways. In one example, the validation response 222 may represent a validation "failed" message to primary SR-PCE 204. In another example, validation engine 208 may request the primary SR-PCE 204 to re-compute the path. Primary SR-PCE 204 may compute the path again, and send a new SID list to validation engine 208 (not shown). In an instance where the new SID list is different than the first SID list computed by primary SR-PCE 204, the validation response 222 may indicate a successful validation. Alternatively or additionally, validation engine 208 may endeavor to validate the new SID list before indicating success of the validation process. In another instance where the new SID list is the same as the first SID list computed by primary SR-PCE 204, validation response 222 may indicate a failed validation to primary SR-PCE 204.

In some examples, validation engine 208 may feature two or more potential modes of operation for policy validation. A first mode of operation may be termed "authoritative mode," for instance, in which validation engine 208 has at least some authority over routing decisions in the network. In authoritative mode, in the example of a failed validation, validation engine 208 may send validation response 222 indicating the failure to primary SR-PCE 204. In turn, primary SR-PCE 204 may send a path computation error message to router 202. In authoritative mode, where the path validation fails, a policy may be considered operationally "down" (e.g., inoperable) due to a validation check failure. Information regarding the failure may be made available to an administrator or to an orchestrator using a variety of methods, such as through command line interface (CLI), system logging protocol (Syslog), simple network management protocol (SNMP), telemetry, etc. A second mode of operation may be termed "non-authoritative mode," in which primary SR-PCE 204 is assumed to be the main controller and/or decision-making authority in the network, at least relative to router 202. In non-authoritative mode, in spite of receiving a validation failed indication in the validation response 222 from the validation engine 208, the SID list produced by primary SR-PCE 204 may be offered to router 202. In effect, in this instance primary SR-PCE 204 overrides the failure notice from validation engine 208. In this instance, validation engine 208 may still relay a message regarding the failed validation, such as a warning message "could not validate," to the administrator or orchestrator.

In some examples, policy validation concepts may be viewed as ensuring the validity of a rendered policy/path by comparing the policy to multiple sources of truth at the network control plane level. The multiple sources of truth (e.g., SID lists from other SR-PCEs) may be used as an assurance loop regarding the particular policy in question. Note that this may be different than checking a group of policies for consistency (e.g., cluster quorums, consensus algorithms, blockchains/signature chains), of which a validation engine may also be capable.

Figure 3:
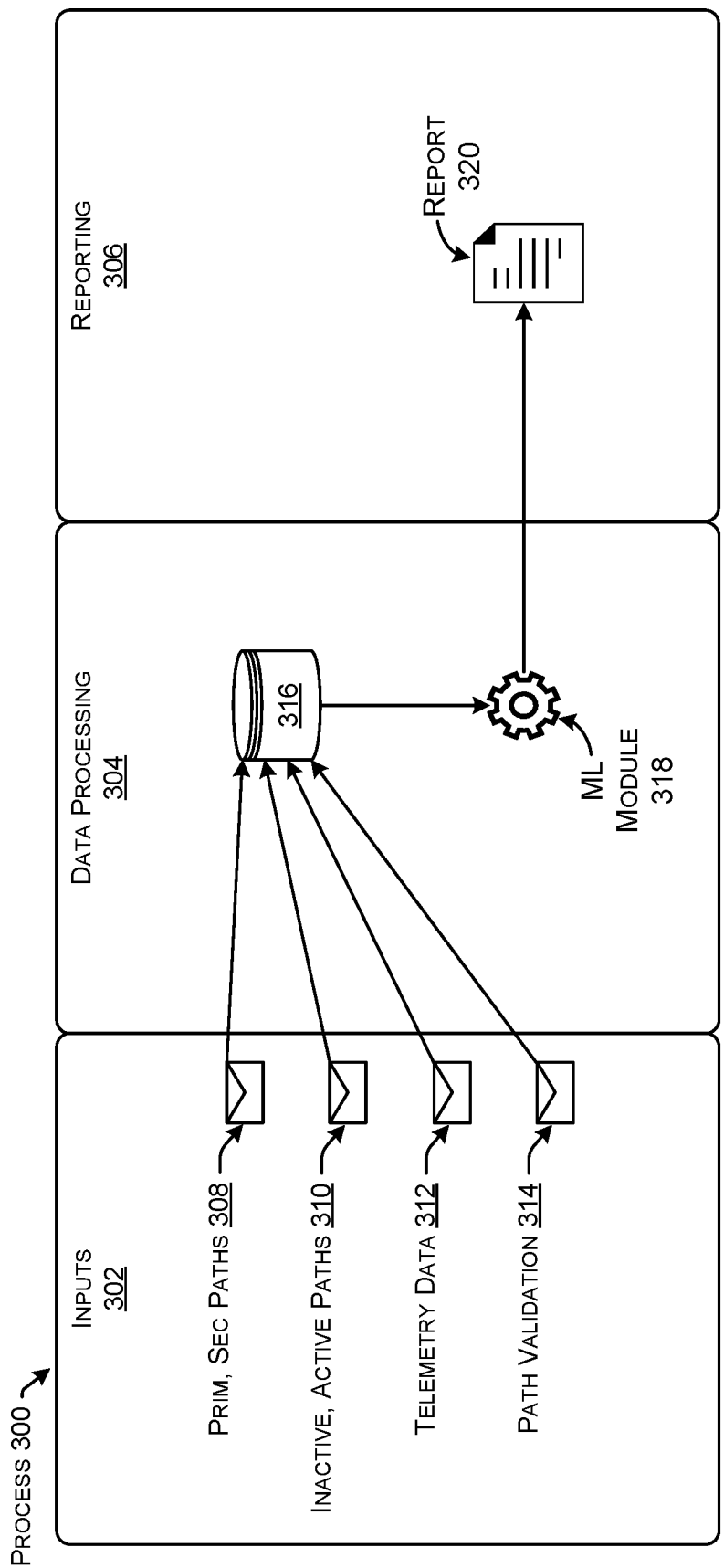
FIG. 3 illustrates an example process related to policy validation among computing devices, in accordance with the present concepts. In some implementations, the example process may be performed by a validation engine.
Figure 6:
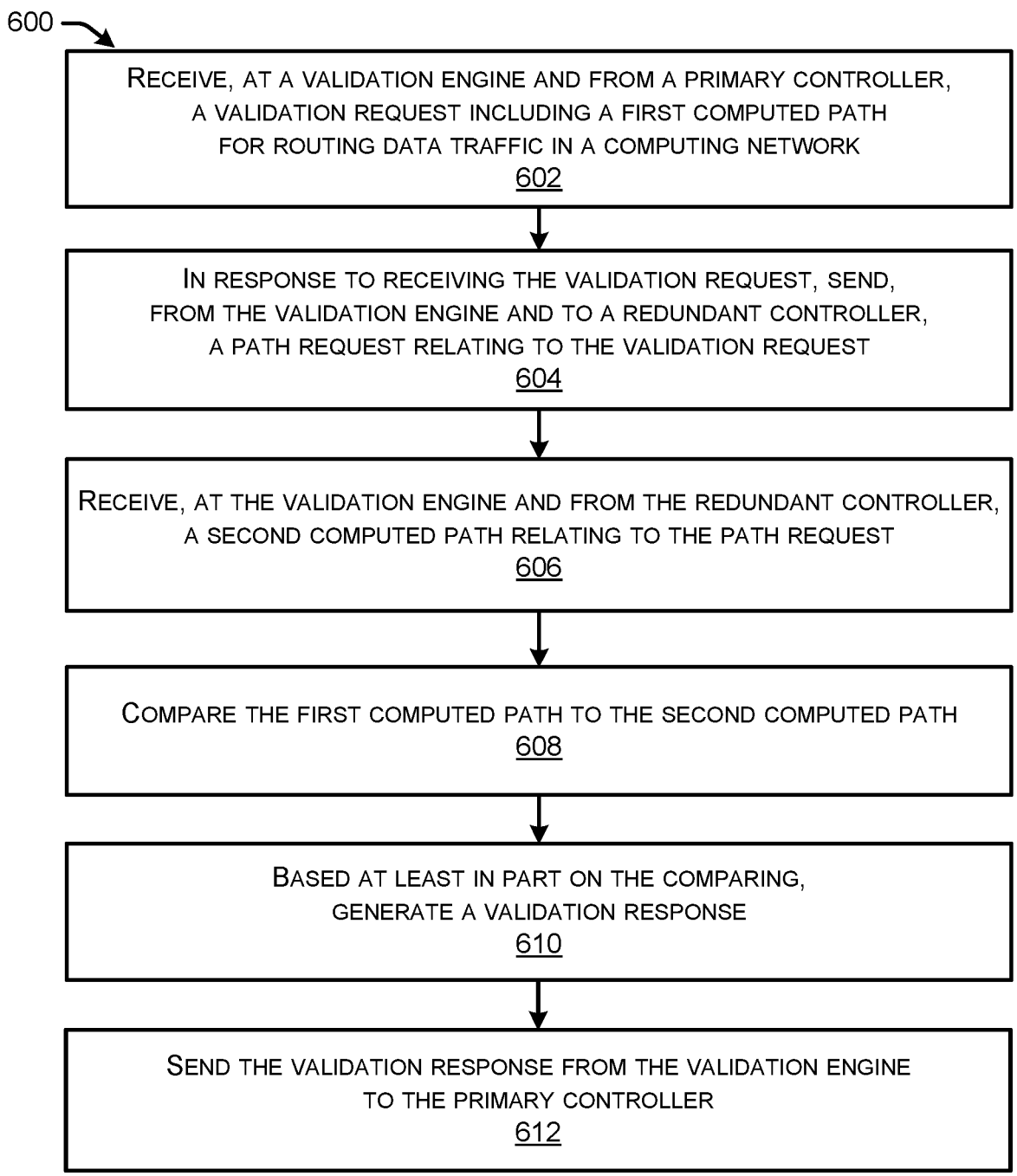
FIGS. 6 and 7 illustrate flow diagrams of example methods for policy validation among network devices, in accordance with the present concepts.

FIGS. 3-6 collectively illustrate additional example functions of a validation engine (such as validation engine 116 and/or 208). FIG. 3 depicts an example process 300 for health validation. As shown in FIG. 3, process 300 may be divided into three portions: inputs 302, data processing 304, and reporting 306. FIG. 4 depicts example inputs 400, which may be similar to inputs 302 of FIG. 3. FIG. 5 depicts example data processing 500, which may be similar to data processing 304 of FIG. 3. FIG. 6 presents another example data processing 600 which may be similar to aspects of data processing 304 of FIG. 3 and/or data processing 500 of FIG. 5.

Referring to FIG. 3, in example process 300, inputs 302 may include primary and/or secondary paths 308, inactive and/or active paths 310, telemetry data 312, and/or path validation results 314. Additional examples of inputs 302 are provided as inputs 400 in FIG. 4. Any of inputs 302 and/or 400, as well as other pertinent data and/or information, may be used by a validation engine to build a validation database 316. Primary and/or secondary paths 308 may include paths obtained from controllers, such as primary SR-PCE 204 and redundant SR-PCE(s) 206 described relative to FIG. 2. For instance, the primary and/or secondary paths 308 may include SID lists, source and destination node internet protocol (IP) addresses, constraints associated with the paths (e.g., cost, latency/delay information), timestamps, etc. The data may be available from a language server protocol state database (LSP-DB) via API. The LSP-DB may also contain information about relevant segment routing traffic engineering (SRTE) tunnels. Inactive and/or active paths 310 may refer to the validation database 316 maintaining a historical record of paths provided by SR-PCEs, potentially between a same source-destination pair. The historical record may also include constraints associated with the paths (e.g., cost, latency/delay, etc.). Telemetry data 312 may include information associated with the SR-PCE, such as central processing unit (CPU) utilization, memory utilization, timestamps, or other basic health parameters of a computing device. Path validation results 314 may include results obtained from a policy validation process, such as the process described by call-flow 200 in FIG. 2. For instance, elements of the validation response 222 or other information from the comparing step 220 may be input to database 316 and/or data processing 304. Referring to FIG. 4, path validation results 402 are shown as a binary indication of whether a path was found to be valid. Note that database 316 may be separate from the network domain. Hence, database 316 may not be synchronized with SR-PCEs directly. For this reason, policy validation concepts may improve the validity of paths provided in large-scale networks where a centralized controller has an inconsistent topology database, leading to invalid path determinations.

In data processing 304, the validation database 316 may be used by a machine learning (ML) module 318 to generate a report 320. The ML module 318 may be a component of the validation engine and/or may be accessible to the validation engine. ML module 318 may perform a variety of processing and/or modelling functions, such as unsupervised and/or supervised learning algorithms and classification modelling. Example functions are shown in FIG. 5 as code 500. The processing and/or modelling functions may utilize the information in database 316, in some examples. Processing may include pre-processing and/or cleaning functions regarding the data in database 316, such as exploratory analysis, checking for missing data, scaling, label encoding to handle multiple categorical variables, and/or otherwise preparing data for further processing and/or modelling functions. See, for example, pre-processing 502 of FIG. 5.

ML module 318 may add additional information to the database 316 as it performs processing and/or modelling functions. For example, ML module 318 may use an unsupervised learning algorithm to determine a health variable for a SR-PCE. The health variable for any given SR-PCE may be added to the database 316. The health variable may be generated using a clustering technique, for instance. The clustering technique may be performed on data in database 316 to derive the health variable. The health variable may be viewed as a preliminary (e.g., initial) health score that may be useful for labelling and/or tagging data. The labelled data may then be used by ML module 318 in a supervised learning algorithm, for instance. See, for example, processing 504 of FIG. 5.

In some examples, ML module 318 may use a supervised learning algorithm to train a classification model to predict a health score for a SR-PCE. For example, ML module 318 may use the health variable introduced above as a class identifier to train a classification model, for instance. Further, the supervised learning algorithm may consume path validation 314 as a class identifier, training the model to predict path validity and/or controller health for future instances. In some examples, the supervised learning algorithm may be a Random Forest algorithm. See, for example, processing 506 of FIG. 5.

In some implementations, once the classification model is trained, the model may be used to predict potential SR-PCE health issues in the network. Input data to the classification model for prediction purposes may have a similar structure to the inputs 302 for training purposes. The classification model may provide a predicted health score as report 320.

In reporting 306, report 320 may be provided to interested parties, such as an administrator or orchestrator of the network. In some examples, report 320 may include information associated with validation response 222 (FIG. 2), path validation 314 (FIG. 3), a health variable or health score of a controller produced by ML module 318, and/or other relevant conclusions about a network and/or computing device(s). A health score of a particular SR-PCE may provide an administrator with valuable oversight as to whether to accept or reject a path calculated by the particular SR-PCE. A health score may indicate predictive failure to an administrator. The report 320 may prompt an administrator or orchestrator to take corrective action, for instance. Corrective action could include predictive maintenance based on the health score, such as reconfiguring the network, and/or other action(s).

To summarize, the policy validation concepts described herein may improve network performance. Policy validation techniques may help determine whether any particular path provided by a controller is valid. In instances of invalid paths, policy validation techniques may help improve the routing of data traffic in a network. Policy validation techniques may also lead to a predictive health score for any controller in a network. The health score may be viewed as an indicator of reliability of the controller to be able to produce robust, reliable routing results. Further, the techniques may be relatively lightweight, featuring low computational cost and/or low bandwidth usage.

Figure 7:
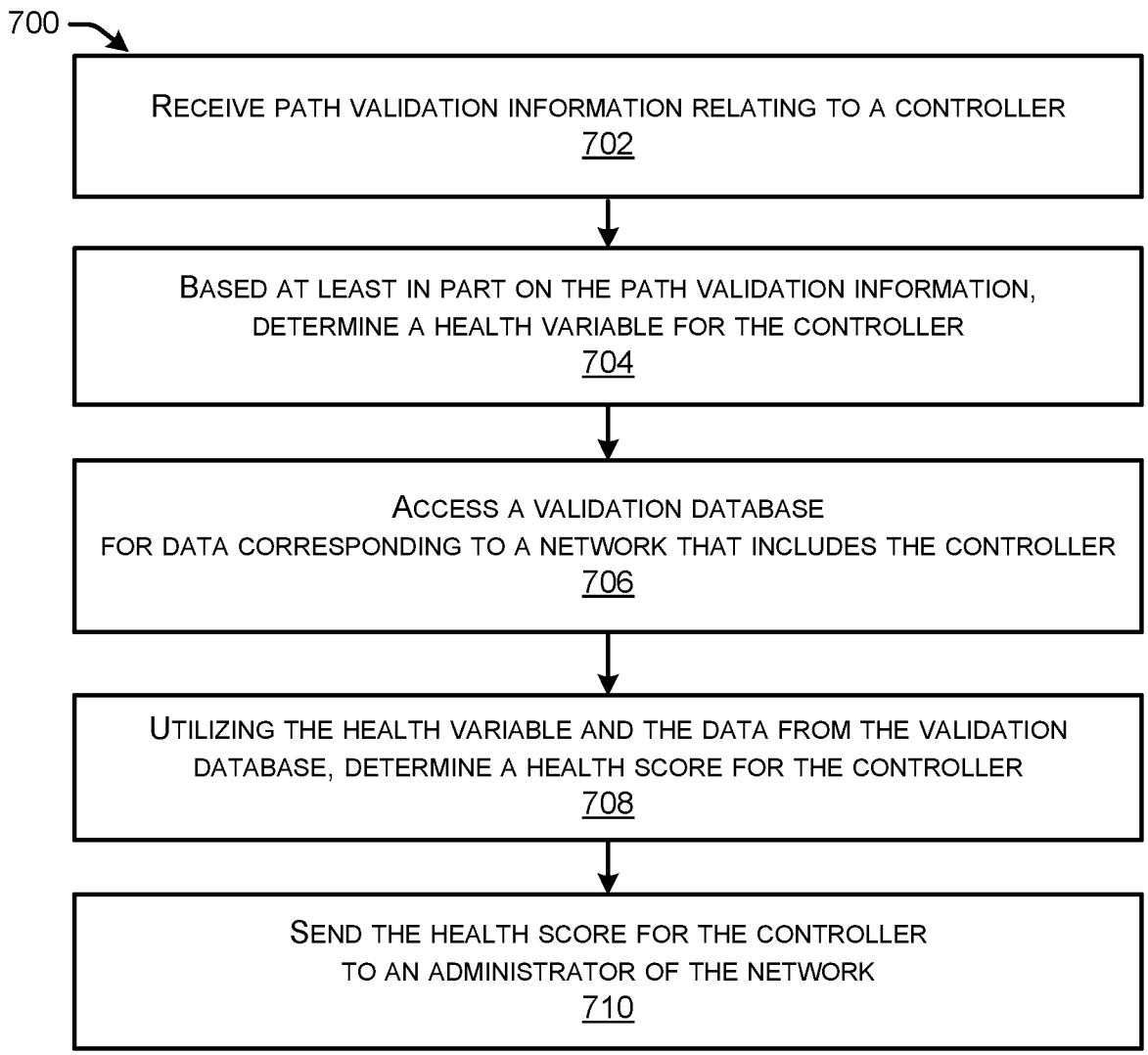

FIGS. 6 and 7 illustrate flow diagrams of example methods 600 and 700 that include functions that may be performed at least partly by a validation engine at a network device, such as validation engine 116 or 208 described relative to FIGS. 1 and 2. The logical operations described herein with respect to FIGS. 6 and 7 may be implemented (1) as a sequence of computer-implemented acts or program modules running on a computing system and/or (2) as interconnected machine logic circuits or circuit modules within the computing system.

The implementation of the various devices and/or components described herein is a matter of choice dependent on the performance and other requirements of the computing system. Accordingly, the logical operations described herein are referred to variously as operations, structural devices, acts, or modules. These operations, structural devices, acts, and modules may be implemented in software, in firmware, in special purpose digital logic, and any combination thereof. It should also be appreciated that more or fewer operations might be performed than shown in the FIGS. 6 and 7 and described herein. These operations may also be performed in parallel, or in a different order than those described herein. Some or all of these operations may also be performed by components other than those specifically identified. Although the techniques described in this disclosure is with reference to specific devices, in other examples, the techniques may be implemented by less devices, more devices, different devices, or any configuration of devices and/or components.

FIG. 6 illustrates a flow diagram of an example method 600 for network devices to perform policy validation techniques. Method 600 may be performed by a computing device (e.g., server 104) communicatively coupled to a primary controller and a redundant controller (e.g., servers 102), for instance. In some examples, method 600 may be performed by a computing device comprising one or more processors and one or more non-transitory computer-readable media storing computer-executable instructions that, when executed by the one or more processors, cause the one or more processors to perform method 600.

At 602, method 600 may include receiving, at a validation engine and from a primary controller, a validation request. The validation request may include a first computed path for routing data traffic in a computing network.

At 604, in response to receiving the validation request, method 600 may include sending, from the validation engine and to a redundant controller, a path request relating to the validation request. For instance, the path request may include information associated with the source and destination nodes of the first computed path, allowing the redundant controller to make a determination about an appropriate path from the source node to the destination node, without relying on the first computed path.

At 606, method 600 may include receiving, at the validation engine and from the redundant controller, a second computed path relating to the path request. In some examples, method 600 may also include receiving, at the validation engine and from additional redundant controllers, additional computed paths relating to the path request. For instance, the validation engine may send additional path requests to potentially any SR-PCEs associated with the computing network that are subscribed to the validation engine.

At 608, method 600 may include comparing the first computed path to the second computed path. A comparison step may also include comparing the first computed path to the additional computed paths described above.

At 610, based at least in part on the comparing, method 600 may include generating a validation response. Stated another way, the validation response may be based on comparing the first computed path with any of the second computed path and/or the additional computed paths. As such, the policy validation process may be a way to determine whether a path is valid by comparing with other trusted sources of information about the network.

At 612, method 600 may include sending the validation response from the validation engine to the primary controller. In some examples, the validation response may be a validation success message indicating that the policy is valid. In other examples, the validation response may be a validation failed message indicating that the policy is invalid. Based at least in part on determining the policy to be invalid, method 600 may further include sending instructions to the primary controller to re-compute the first computed path, resulting in an updated path. The updated path may be received at the validation engine, from the primary controller. In response to receiving the updated path, method 600 may include comparing the updated path to the first computed path. In this example, generating the validation response may further be based on comparing the updated path to the first computed path. If the updated path and the first computed paths match, the match may indicate that the validation process has again failed, and the there may be an issue with health of the controller. If the updated path and first computed path do not match, the mismatch may indicate that the controller is in good health. For instance, the controller may be operating with updated information that allows it to produce a more desirable policy result.

In some implementations, method 600 may further include determining a health variable for the primary controller. The health variable may be based on the first computed path for instance. The health variable may in turn be utilized to determine a health score for the primary controller. The health score may be used to predict how likely the primary controller is to provide a valid policy for traffic routing through the network, for instance. The health score may be determined by a machine learned model. The machine learned model may utilize the first computed path, the second computed path, the additional computed paths, and/or the health variable to determine the health score, in some examples.

FIG. 7 illustrates a flow diagram of an example method 700 for network devices to perform policy validation techniques. Method 700 may be performed by a computing device (e.g., server 104) communicatively coupled to at least one controller (e.g., server 102), for instance. In some examples, method 700 may be performed by a computing device comprising one or more processors and one or more non-transitory computer-readable media storing computer-executable instructions that, when executed by the one or more processors, cause the one or more processors to perform method 700.

At 702, method 700 may include receiving path validation information relating to a controller.

At 704, based at least in part on the path validation information, method 700 may include determining a health variable for the controller.

At 706, method 700 may include accessing a validation database for data corresponding to a network that includes the controller. In some examples, the data from the validation database and/or the health variable for the controller may be used to train a classification model.

At 708, utilizing the health variable and the data from the validation database, method 700 may include determining a health score for the controller. In some examples, the health score may comprise a prediction of reliability of the controller. The health score may be determined using the classification model described above.

At 710, method 700 may include sending the health score for the controller to an administrator of the network. Method 700 may include additional actions regarding the health score, such as storing information related to the health score in the validation database.

Figure 8:
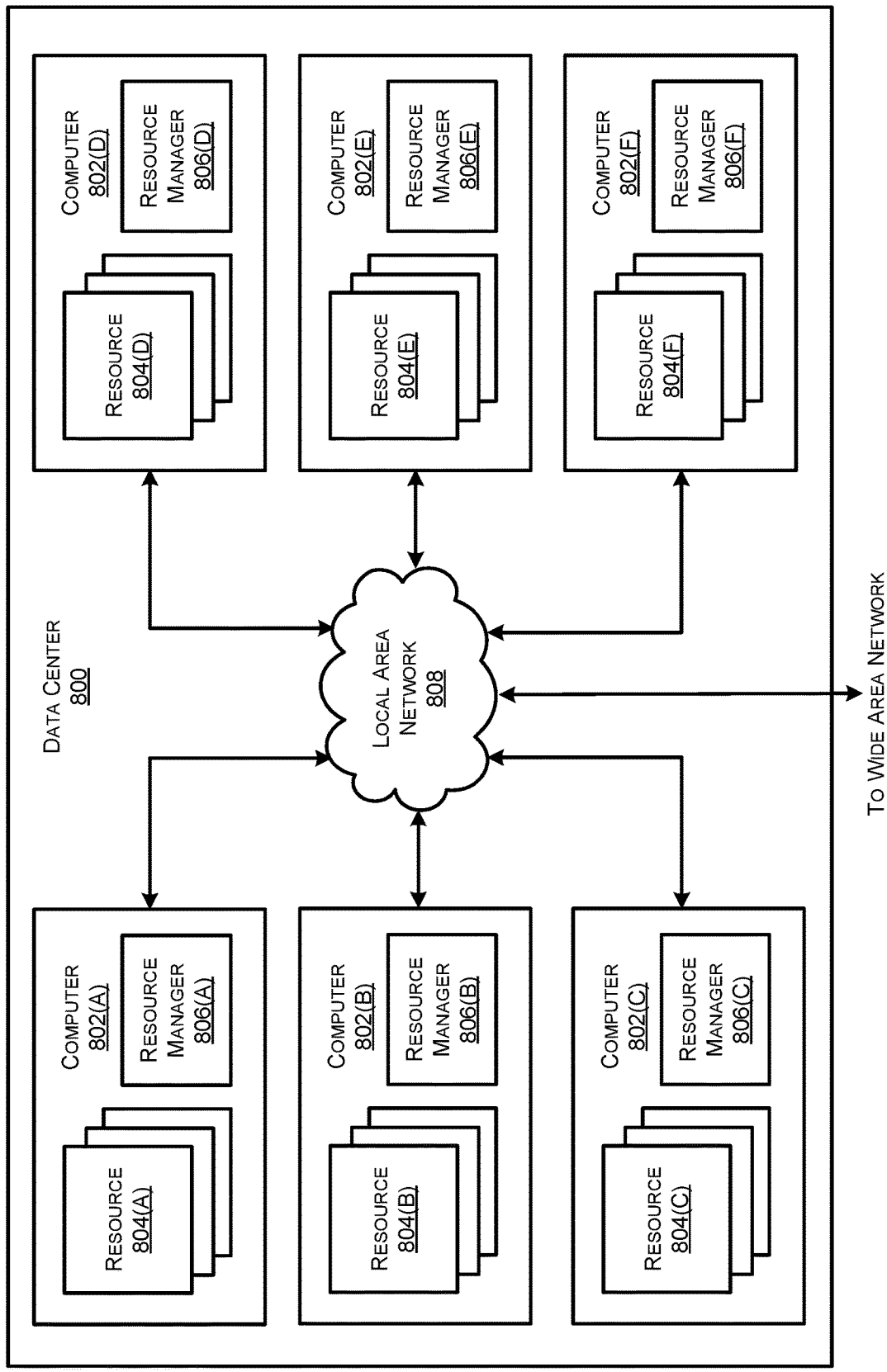
FIG. 8 illustrates a computing system diagram illustrating a configuration for a data center that can be utilized to implement aspects of the technologies disclosed herein.

FIG. 8 is a computing system diagram illustrating a configuration for a data center 800 that can be utilized to implement aspects of the technologies disclosed herein. The example data center 800 shown in FIG. 8 includes several computers 802A-802F (which might be referred to herein singularly as "a computer 802" or in the plural as "the computers 802") for providing computing resources. In some examples, the resources and/or computers 802 may include, or correspond to, any type of networked device described herein, such as a server (102 or 104), a router (106 or 108), and/or an access point (110). Although, computers 802 may comprise any type of networked device, such as servers, switches, routers, hubs, bridges, gateways, modems, repeaters, access points, hosts, etc.

The computers 802 can be standard tower, rack-mount, or blade server computers configured appropriately for providing computing resources. In some examples, the computers 802 may provide computing resources 804 including data processing resources such as virtual machine (VM) instances or hardware computing systems, database clusters, computing clusters, storage clusters, data storage resources, database resources, networking resources, and others. Some of the computers 802 can also be configured to execute a resource manager 806 capable of instantiating and/or managing the computing resources. In the case of VM instances, for example, the resource manager 806 can be a hypervisor or another type of program configured to enable the execution of multiple VM instances on a single computer 802. Computers 802 in the data center 800 can also be configured to provide network services and other types of services.

In the example data center 800 shown in FIG. 8, an appropriate local area network (LAN) 808 is also utilized to interconnect the computers 802A-802F. It should be appreciated that the configuration and network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between data centers 800, between each of the computers 802A-802F in each data center 800, and, potentially, between computing resources in each of the computers 802. It should be appreciated that the configuration of the data center 800 described with reference to FIG. 8 is merely illustrative and that other implementations can be utilized.

In some examples, the computers 802 may each execute one or more application containers and/or virtual machines to perform techniques described herein. For instance, the containers and/or virtual machines may serve as server devices, controllers, a validation engine, user devices, and/or routers in a cloud computing network.

In some instances, the data center 800 may provide computing resources, like application containers, VM instances, and storage, on a permanent or an as-needed basis. Among other types of functionality, the computing resources provided by a cloud computing network may be utilized to implement the various services and techniques described above. The computing resources 804 provided by the cloud computing network can include various types of computing resources, such as data processing resources like application containers and VM instances, data storage resources, networking resources, data communication resources, network services, and the like.

Each type of computing resource 804 provided by the cloud computing network can be general-purpose or can be available in a number of specific configurations. For example, data processing resources can be available as physical computers or VM instances in a number of different configurations. The VM instances can be configured to execute applications, including web servers, application servers, media servers, database servers, some or all of the network services described above, and/or other types of programs. Data storage resources can include file storage devices, block storage devices, and the like. The cloud computing network can also be configured to provide other types of computing resources 804 not mentioned specifically herein.

The computing resources 804 provided by a cloud computing network may be enabled in one embodiment by one or more data centers 800 (which might be referred to herein singularly as "a data center 800" or in the plural as "the data centers 800"). The data centers 800 are facilities utilized to house and operate computer systems and associated components. The data centers 800 typically include redundant and backup power, communications, cooling, and security systems. The data centers 800 can also be located in geographically disparate locations. One illustrative embodiment for a data center 800 that can be utilized to implement the technologies disclosed herein will be described below with regard to FIG. 9.

Figure 9:
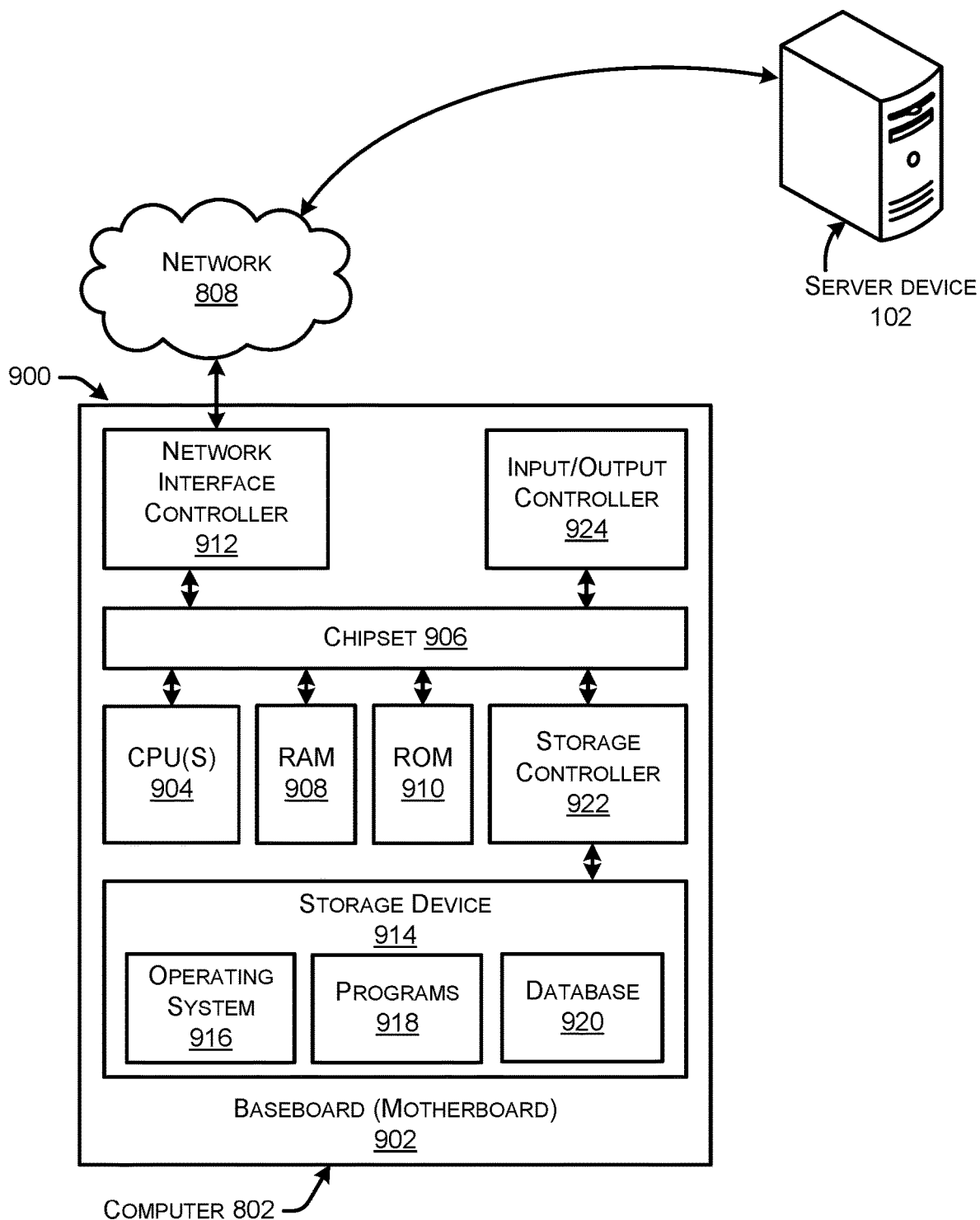
FIG. 9 is a computer architecture diagram showing an illustrative computer hardware architecture for implementing a device that can be utilized to implement aspects of the various technologies presented herein.

FIG. 9 shows an example computer architecture 900 for a computer 802 capable of executing program components for implementing the functionality described above. The computer architecture 900 shown in FIG. 9 illustrates a conventional server computer, workstation, desktop computer, laptop, tablet, network appliance, e-reader, smartphone, and/or other computing device, and can be utilized to execute any of the software components presented herein. The computer 802 may, in some examples, correspond to a physical device described herein (e.g., server 104), and may comprise networked devices such as servers, switches, routers, hubs, bridges, gateways, modems, repeaters, access points, etc. For instance, computer 802 may correspond to any servers 102 or 104, routers 106 or 108, and/or access points 110.

As shown in FIG. 9, the computer 802 includes a baseboard 902, or "motherboard," which is a printed circuit board to which a multitude of components or devices can be connected by way of a system bus or other electrical communication paths. In one illustrative configuration, one or more central processing units ("CPUs") 904 operate in conjunction with a chipset 906. The CPUs 904 can be standard programmable processors that perform arithmetic and logical operations necessary for the operation of the computer 802.

The CPUs 904 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 906 provides an interface between the CPUs 904 and the remainder of the components and devices on the baseboard 902. The chipset 906 can provide an interface to a RAM 908, used as the main memory in the computer 802. The chipset 906 can further provide an interface to a computer-readable storage medium such as a read-only memory ("ROM") 910 or non-volatile RAM ("NVRAM") for storing basic routines that help to startup the computer 802 and to transfer information between the various components and devices. The ROM 910 or NVRAM can also store other software components necessary for the operation of the computer 802 in accordance with the configurations described herein.

The computer 802 can operate in a networked environment using logical connections to remote computing devices and computer systems through a network, such as the network 808 and/or a cloud computing network. The chipset 906 can include functionality for providing network connectivity through a network interface controller (NIC) 912, such as a gigabit Ethernet adapter. The NIC 912 is capable of connecting the computer 802 to other computing devices over a network. For instance, in the example shown in FIG. 9, NIC 912 may help facilitate transfer of communications or other data, such as validation response 222, over the network 808 with server 102. It should be appreciated that multiple NICs 912 can be present in the computer 802, connecting the computer to other types of networks and remote computer systems.

The computer 802 can be connected to a storage device 914 that provides non-volatile storage for the computer. The storage device 914 can store an operating system 916, programs 918, database 920, and/or other data. In some examples, database 920 may represent validation database 316. The storage device 914 can be connected to the computer 802 through a storage controller 922 connected to the chipset 906, for example. The storage device 914 can consist of one or more physical storage units. The storage controller 922 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 802 can store data on the storage device 914 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 914 is characterized as primary or secondary storage, and the like.

For example, the computer 802 can store information to the storage device 914 by issuing instructions through the storage controller 922 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 802 can further read information from the storage device 914 by detecting the physical states or characteristics of one or more particular locations within the physical storage units.

In addition to the mass storage device 914 described above, the computer 802 can have access to other computer-readable storage media to store and retrieve information, such as policies, program modules, data structures, and/or other data. It should be appreciated by those skilled in the art that computer-readable storage media is any available media that provides for the non-transitory storage of data and that can be accessed by the computer 802. In some examples, the operations performed by the network 808, and or any components included therein, may be supported by one or more devices similar to computer 802. Stated otherwise, some or all of the operations performed by the network 808, and or any components included therein, may be performed by one or more computer devices 802 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, ternary content addressable memory (TCAM), and/or other optical storage, magnetic cassettes, magnetic tape, magnetic disk storage or other magnetic storage devices, or any other medium that can be used to store the desired information in a non-transitory fashion.

As mentioned briefly above, the storage device 914 can store an operating system 916 utilized to control the operation of the computer 802. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage device 914 can store other system or application programs and data utilized by the computer 802.

In one embodiment, the storage device 914 or other computer-readable storage media is encoded with computer-executable instructions which, when loaded into the computer 802, transform the computer from a general-purpose computing system into a special-purpose computer capable of implementing the embodiments described herein. These computer-executable instructions transform the computer 802 by specifying how the CPUs 904 transition between states, as described above. According to one embodiment, the computer 802 has access to computer-readable storage media storing computer-executable instructions which, when executed by the computer 802, perform the various processes described above with regards to FIGS. 1-7. The computer 802 can also include computer-readable storage media having instructions stored thereupon for performing any of the other computer-implemented operations described herein.

The computer 802 can also include one or more input/output controllers 924 for receiving and processing input from a number of input devices, such as a keyboard, a mouse, a touchpad, a touch screen, an electronic stylus, or other type of input device. Similarly, an input/output controller 924 can provide output to a display, such as a computer monitor, a flat-panel display, a digital projector, a printer, or other type of output device. It will be appreciated that the computer 802 might not include all of the components shown in FIG. 9, can include other components that are not explicitly shown in FIG. 9, or might utilize an architecture completely different than that shown in FIG. 9.

As described herein, the computer 802 may comprise one or more devices, such as server 102 or 104, and/or other devices. The computer 802 may include one or more hardware processors 904 (processors) configured to execute one or more stored instructions. The processor(s) 904 may comprise one or more cores. Further, the computer 802 may include one or more network interfaces configured to provide communications between the computer 802 and other devices, such as the communications described herein as being performed by validation engine 116 at server 104 and servers 102, and/or other devices. In some examples, the communications may include data, packet, request, response, and/or other information transfer, for instance. The network interfaces may include devices configured to couple to personal area networks (PANs), wired and wireless local area networks (LANs), wired and wireless wide area networks (WANs), and so forth. For example, the network interfaces may include devices compatible with Ethernet, Wi-Fi™, and so forth.

The programs 918 may comprise any type of programs or processes to perform the techniques described in this disclosure in accordance with policy validation techniques. For instance, the programs 918 may include validation engine 116 or 208 and/or ML module 318. The programs 918 may cause the computer 802 to perform techniques for communicating with other devices using any type of protocol or standard usable for determining connectivity. Additionally, the programs 918 may comprise instructions that cause the computer 802 to perform the specific techniques for validating paths or policies and/or for determining a health variable or health score.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative of some embodiments that fall within the scope of the claims of the application.

What is claimed is:

1. A computer-implemented method comprising:
   receiving, at a validation engine and from a primary controller, a validation request including a first computed path for routing data traffic in a computing network;
   in response to receiving the validation request, sending, from the validation engine and to a redundant controller, a path request relating to the validation request;
   receiving, at the validation engine and from the redundant controller, a second computed path relating to the path request;
   comparing the first computed path to the second computed path;
   based at least in part on the comparing, generating a validation response; and
   sending the validation response from the validation engine to the primary controller.

2. The computer-implemented method of claim 1, further comprising:
   receiving, at the validation engine and from additional redundant controllers, additional computed paths relating to the path request,
   wherein the generating the validation response is further based on comparing the first computed path with the additional computed paths.

3. The computer-implemented method of claim 1, further comprising:
   determining, based at least in part on the comparing, that a policy associated with the validation request is invalid.

4. The computer-implemented method of claim 3, further comprising:
   sending, based at least in part on determining the policy to be invalid, instructions to the primary controller to re-compute an updated path;
   receiving an updated path from the primary controller; and
   in response to receiving the updated path, comparing the updated path to the first computed path,
   wherein the generating the validation response is further based on comparing the updated path to the first computed path.

5. The computer-implemented method of claim 1, further comprising:
   determining a health variable for the primary controller.

6. The computer-implemented method of claim 5, further comprising:
   utilizing the health variable to determine a health score for the primary controller.

7. The computer-implemented method of claim 6, wherein the health score is determined by a machine learned model.

8. The computer-implemented method of claim 7, wherein the machine learned model utilizes the first computed path, the second computed path, and the health variable to determine the health score.

9. A computing device comprising:
   one or more processors; and
   one or more non-transitory computer-readable media storing computer-executable instructions that, when executed by the one or more processors, cause the one or more processors to:
   receive, from a primary controller, a validation request including a first computed path for routing data traffic in a computing network;
   in response to receiving the validation request, send, to a redundant controller, a path request relating to the validation request;
   receive, from the redundant controller, a second computed path relating to the path request;
   compare the first computed path to the second computed path;
   based at least in part on comparing the first computed path to the second computed path, generate a validation response; and
   send the validation response to the primary controller.

10. The computing device of claim 9, wherein the computer-executable instructions further cause the one or more processors to:
    receive, from additional redundant controllers, additional computed paths relating to the path request,
    wherein the generating the validation response is further based on comparing the first computed path with the additional computed paths.

11. The computing device of claim 9, wherein the computer-executable instructions further cause the one or more processors to:
    determine, based at least in part on the comparing, that a policy associated with the validation request is invalid.

12. The computing device of claim 11, wherein the computer-executable instructions further cause the one or more processors to:
    send, based at least in part on determining the policy to be invalid, instructions to the primary controller to re-compute an updated path;
    receive an updated path from the primary controller; and
    in response to receiving the updated path, compare the updated path to the first computed path,
    wherein the generating the validation response is further based on comparing the updated path to the first computed path.

13. The computing device of claim 9, wherein the computer-executable instructions further cause the one or more processors to:
    determine a health variable for the primary controller.

14. The computing device of claim 13, wherein the computer-executable instructions further cause the one or more processors to:

utilize the health variable to determine a health score for the primary controller.

15. The computing device of claim 14, wherein the health score is determined by a machine learned model.

16. The computing device of claim 15, wherein the machine learned model utilizes the first computed path, the second computed path, and the health variable to determine the health score.

17. A method comprising:

receiving path validation information relating to a controller;

based at least in part on the path validation information, determining a health variable for the controller;

accessing a validation database for data corresponding to a network that includes the controller;

utilizing the health variable and the data from the validation database, determining a health score for the controller; and sending the health score for the controller to an administrator of the network.

18. The method of claim 17, wherein the health score comprises a prediction of reliability of the controller.

19. The method of claim 18, further comprising:

utilizing the data from the validation database, training a classification model, wherein the determining the health score comprises using the classification model to determine the health score.

20. The method of claim 17, further comprising:

storing information related to the health score in the validation database.

* * * * *